United States Patent
Machiguchi

[19]

[11] Patent Number: 6,064,635
[45] Date of Patent: May 16, 2000

[54] CHANGEABLE STORAGE DEVICE OF PLURAL OPTICAL RECORDING MEDIA OF SAME PHYSICAL FORM AND DIFFERENT LOGICAL FORMATS

[75] Inventor: Yoshihiro Machiguchi, Tokyo, Japan

[73] Assignee: Sony Corporation, Tokyo, Japan

[21] Appl. No.: 09/087,138

[22] Filed: May 28, 1998

[30] Foreign Application Priority Data

Jun. 5, 1997 [JP] Japan .................................... 9-148093

[51] Int. Cl.[7] .................................................. G11B 17/22
[52] U.S. Cl. ............................................... 369/34; 369/58
[58] Field of Search ................................. 369/34, 33, 30, 369/32, 37, 36, 38, 39, 178, 58

[56] References Cited

U.S. PATENT DOCUMENTS

| | | | |
|---|---|---|---|
| 5,463,605 | 10/1995 | Nishida et al. ............................ | 369/58 |
| 5,715,216 | 2/1998 | Dang et al. ................................ | 369/34 |
| 5,726,957 | 3/1998 | Hisamatsu et al. ....................... | 369/30 |
| 5,764,610 | 6/1998 | Yoshida et al. ........................... | 369/58 |
| 5,831,947 | 11/1998 | Okazaki et al. .......................... | 369/34 |
| 5,883,864 | 3/1999 | Saliba ....................................... | 369/34 |
| 5,886,961 | 3/1999 | Yamashita et al. ....................... | 369/34 |

*Primary Examiner*—Tan Dinh
*Attorney, Agent, or Firm*—Frommer Lawrence & Haug, LLP.; William S. Frommer

[57] ABSTRACT

A changeable storage device for storing a plurality of recording media having the same physical form but different logical formats. A desired recording medium is selected from the stored recording media, and data is recorded on or reproduced from the selected recording medium. A storage system for managing the recording media stored in the changeable storage device, discriminating the type of each of the stored recording media, and storing the type information in a memory included in the changeable storage device, so that a host computer may request information stored in the selected recording medium by transmitting the type information of the selected recording medium to the changeable storage device through a given interface. The changeable storage device manages the storage media using the type information for discriminating the type of the recording medium stored in the memory included therein.

11 Claims, 8 Drawing Sheets

| Byte | Bit 7 | Bit 6 | Bit 5 | Bit 4 | Bit 3 | Bit 2 | Bit 1 | Bit 0 |
|---|---|---|---|---|---|---|---|---|
| 0~31 | [MSB] Volume Identification Template Field<br><br>Byte 29 ~ Byte 31:DISK TYPE INFORMATION [LSB] | | | | | | | |
| 32 | Reserved | | | | | | | |
| 33 | Reserved | | | | | | | |
| 34 | [MSB] | | | | | | | |
| 35 | Minimum Volume Sequence Number [LSB] | | | | | | | |
| 36 | Reserved | | | | | | | |
| 37 | Reserved | | | | | | | |
| 38 | [MSB] | | | | | | | |
| 39 | Maximum Volume Sequence Number [LSB] | | | | | | | |

FIG.1

| Byte | Bit 7 | Bit 6 | Bit 5 | Bit 4 | Bit 3 | Bit 2 | Bit 1 | Bit 0 |
|---|---|---|---|---|---|---|---|---|
| 0 | Operation Code (b6h) ||||||||
| 1 | Logical Unit Number ||| Rsrv | Element Type Code ||||
| 2 | [MSB] |||||||| 
| 3 | Element Address                                                     [LSB] ||||||||
| 4 | Reserved ||||||||
| 5 | Reserved (0) |||| Send Action Code ||||
| 6 | Reserved ||||||||
| 7 | Reserved ||||||||
| 8 | [MSB] ||||||||
| 9 | Pameter List Length                                                 [LSB] ||||||||
| 10 | Reserved ||||||||
| 11 | Control ||||||||

FIG.2

CHANGEABLE STORAGE DEVICE OF PLURAL OPTICAL RECORDING MEDIA OF SAME PHYSICAL FORM AND DIFFERENT LOGICAL FORMATS

BACKGROUND OF THE INVENTION

1. Field of the Invention

The present invention relates to a data storage system which is arranged to connect to a changeable optical disk drive having a capability of storing different kinds of optical disks with the same form but various kinds of data formats to a host computer through an interface so that the host computer may control the changeable optical disk drive.

2. Description of the Related Art

Storage of recording media such as an optical disk where data is recorded in a unique storage unit is effective in managing two or more recording media.

For example, the so-called disk changer, which accommodate one or more same kind of disks, is arranged so that the management information contained in the disk stored therein is managed by a device connected outside such as a host computer. The disk stored in the disk changer is managed under the title added to each disk by the host computer. The management of the disk is often realized by the application run in the host computer.

There has been conventionally known a non-changeable CD-ROM (compact disk for read only memory) drive having a capability of loading only one CD-ROM in a disk tray and a SCSI-1 interface so that the CD-ROM drive may be controlled from the host computer.

However, the SCSI-1 interface does not provide a capability of controlling the so-called changeable CD-ROM drive arranged to load two or more recording media so that a desirous medium may be selectively reproduced.

Further, the non-changeable CD-ROM drive has provided a capability of reproducing both of the CD-DA (Compact Disc for Digital Audio) and the CD-ROM (Compact Disk for Read-only Memory). In actual, however, for discriminating a disk type, the host computer cannot recognize it until the disk drive reproduces a TOC (Table of Content) area that corresponds to a management area and transfer the reproduced identifier to the host computer through the SCSI-I interface.

Today, many kinds of recording media are prevailing in the society. Concretely, many disklike recording media having various kinds of writing functions have been proposed such as a read-only disk, a write-only disk and a rewritable disk.

In this circumstance, there has been increasingly enhanced a request for storing different kinds of disks in one disk changer. As a result, it is necessary to consider that a request is rising for discriminating each disk type of recording media loaded in the disk changer.

For example, the disk type may be discriminated on the identifier recorded in the TOC (Table of Content) that is served as a management area on the disk. A higher laser power than a given level may erroneously erase the recorded content. In place, since the management of the disk is often realized by the application run on the host computer as mentioned above, it is considered that each type of the disks loaded in the changer may be registered in the storage device such as a harddisk drive located in the host computer. In this case, when reading or writing the data from or on the disk or retrieving it, the registered data may be used for the purpose.

However, in a case that the disk to be stored in the disk changer is managed by the data registered in the host computer, this kind of management is effective only when the combination of the disk changers connected to the host computer is fixed. If another combination is connected to the host computer, it is necessary to replace the data registered in the host computer.

SUMMARY OF THE INVENTION

It is therefore an object of the present invention to provide to a method for transmitting information and a device for saving a recording medium which are arranged to discriminate each type of the recording media without having to make sure of the content recorded on the recording medium and manage the recording medium without having to depend on the external device such as the host computer.

In order to solve the foregoing shortcomings, a data storage system includes: a storage unit for storing two or more recording media with the physically same form but the different logical formats of the data recorded thereon; a conveying unit for selecting a desirous recording medium from the recording media loaded into the storage unit and loading the selected medium on a driving unit; a storage unit for storing type information on which two or more recording media loaded in the storage unit are discriminated; a control unit for controlling write of the type information of the recording medium in a manner to correspond to the recording medium stored in the storage unit or read of the type information of the recording medium from the storage unit; a storage device for recording media composed of an interface through which data is transferred to the control unit based on a given interface standard; and a host computer for controlling transmission of the type information to the storage device for recording media.

Further, a method for retrieving a desirous recording medium in the changeable storage device for storing recording media with the physically same form but the different logical formats of the data recorded thereon, selecting the desirous recording medium from the stored recording media and record or reproduce data on or from the desirous recording medium, from the host computer through the given interface, includes the steps of: transferring type information for indicating each type of the recording media from the host computer to the changeable storage device for recording media; receiving the identifier for indicating the retrieved result transferred from the storage device for recording media in the host computer; transferring a request signal for requesting the retrieved result from the host computer to the storage device for recording media; and receiving the retrieved result transferred from the host computer to the storage device for recording media.

BRIEF DESCRIPTION OF THE DRAWINGS

FIG. 1 is a view showing a data structure about a volume tag of the SCSI-2 standard applied to the present invention;

FIG. 2 is a view showing a data structure about a send volume tag of the SCSI-2 standard applied to the present invention;

DESCRIPTION OF THE PREFERRED EMBODIMENTS

The description will be oriented to the embodiment of the present invention with reference to the appended drawings. This embodiment is the application of the information transmitting method for transmitting command information based on a peripheral equipment interface standard to the transmission of data between the host computer and the disk changer.

The interface standard is standardized to contain the title information of the recording medium. For example, the interface standard is a SCSI-2 (Small Computer System Interface-2) standard that is standardized to contain a volume identification template field 1a as the title information 1a of the recording medium in the volume tag 1. The present invention employs this SCSI-2 standard. This volume tag 1 is transmitted after the send volume tag 2 in which the command information shown in FIG. 2 is defined. The volume tag 1 contains the defined data for indicating the parameters of the send volume tag 2.

The information transmitting method according to the present invention is arranged to locate the type information of the recording medium in the volume ID template field of the volume tag 1.

Figure 3:
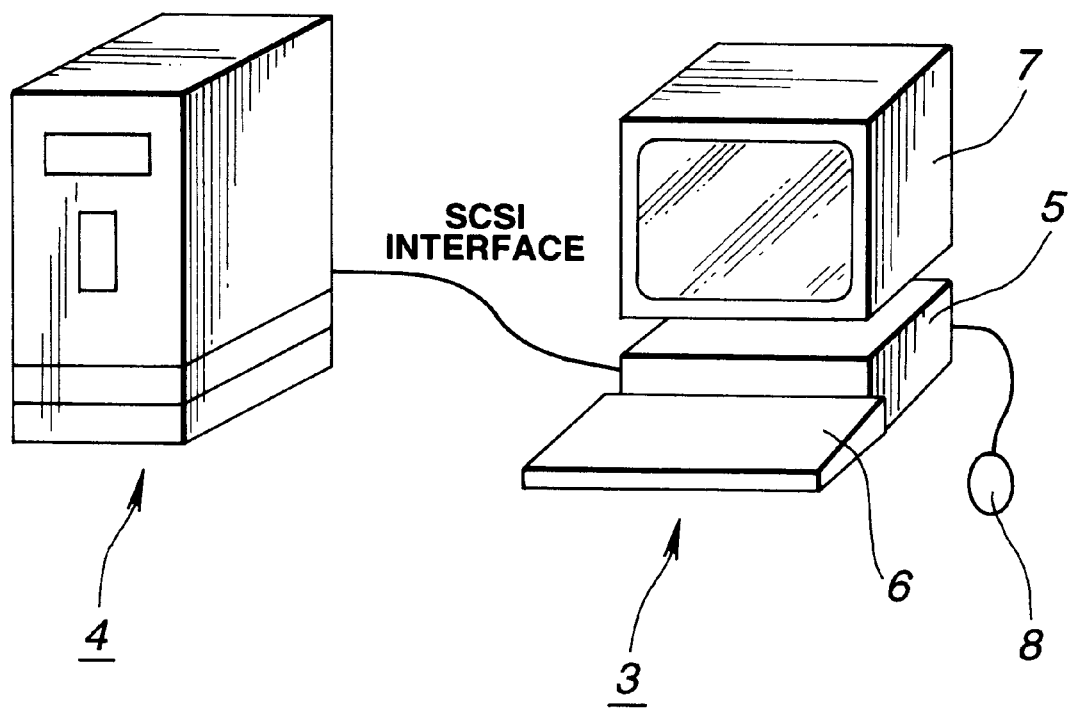
FIG. 3 is a view showing an outer appearance of a changeable storage device for recording media and a host computer applied to the present invention.

Hereafter, the description will be oriented to the transfer of data between a host computer 3 and a disk changer 4 for storing disks served as recording media as shown in FIG. 3, based on the SCSI-2 interface standard.

The host computer 3 is configured of a main body 5, a keyboard 6, a display 7, and a mouse 8. This host computer 3 is connected with the disk changer 4 through the SCSI-2 standard interface.

Figure 4:
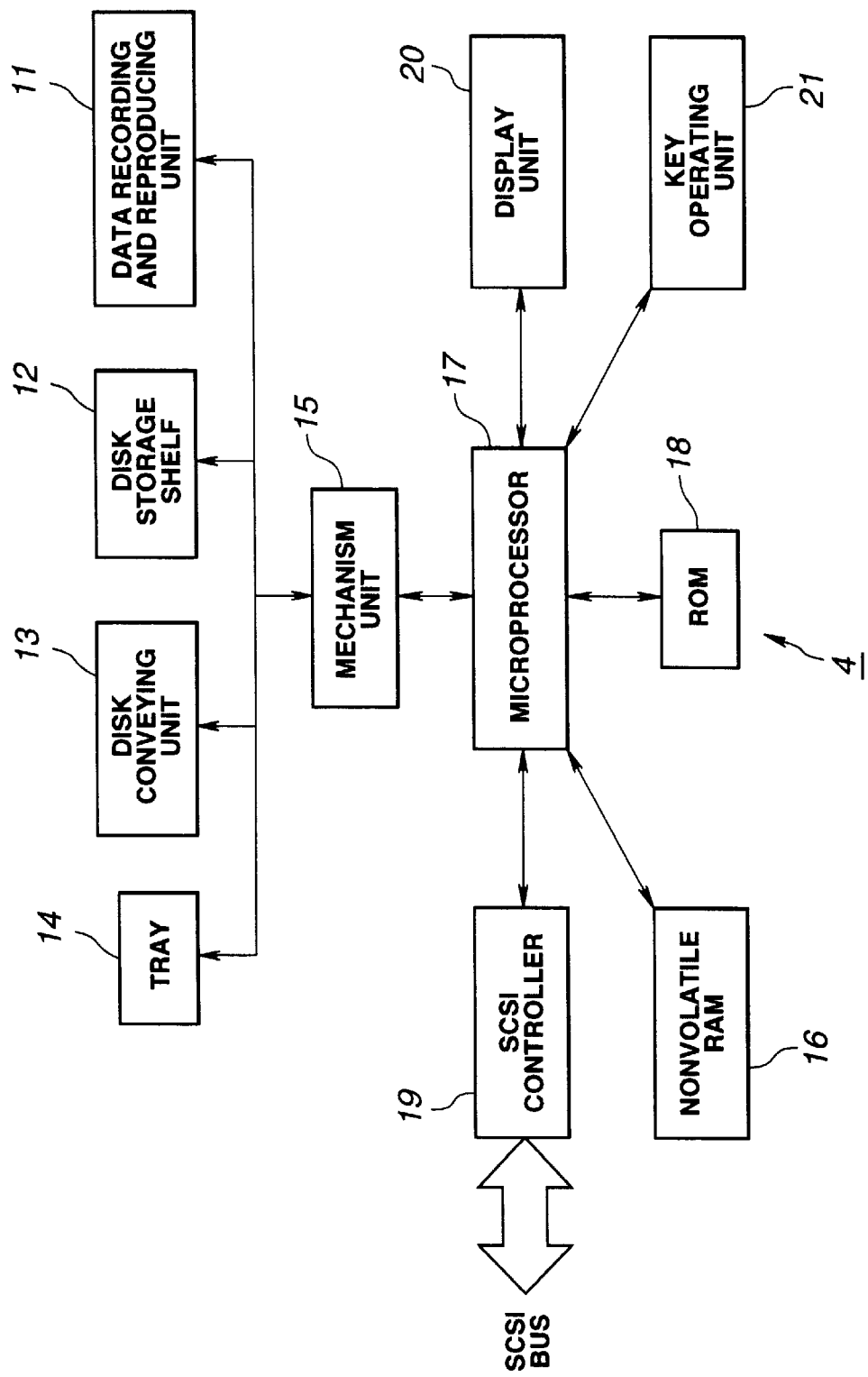
FIG. 4 is a block diagram showing an internal arrangement of a changeable storage device for recording media applied to the present invention.

The disk changer 4 utilizes the storage device for recording media according to the present invention. As shown in FIG. 4, the disk changer 4 includes a data recording and reproducing unit 11 for writing and reading data on and from the disk, a disk storage shelf 12 for storing plural disks, a disk conveying unit 13 for conveying one of the disks stored in the disk storage shelf 12 into the data recording and reproducing unit 11, a tray 14 for storing the disks in the disk changer 4 or ejecting the disk from the disk changer 4, a mechanism unit 15 for operating the data recording and reproducing unit 11, the disk storage shelf 12, the disk conveying unit 13 and the tray 14, a nonvolatile RAM 16 served as storage means for storing various kinds of information stored in plural disks stored in the disk storage shelf 12, a microprocessor 17 having a function of writing and reading various kinds of information of disks on and from the nonvolatile RAM 16, a ROM 18 for storing a program and data of the microprocessor 17, a SCSI controller 19 served as I/O control means for controlling I/O of various kinds of information stored in the nonvolatile RAM 16, located at a given location inside of the command information transmitted by the peripheral equipment interface of the SCSI-2 standard, a display unit 20 for displaying various kinds of information, and a key operating unit 21 to be operated from the outside.

Figure 5:
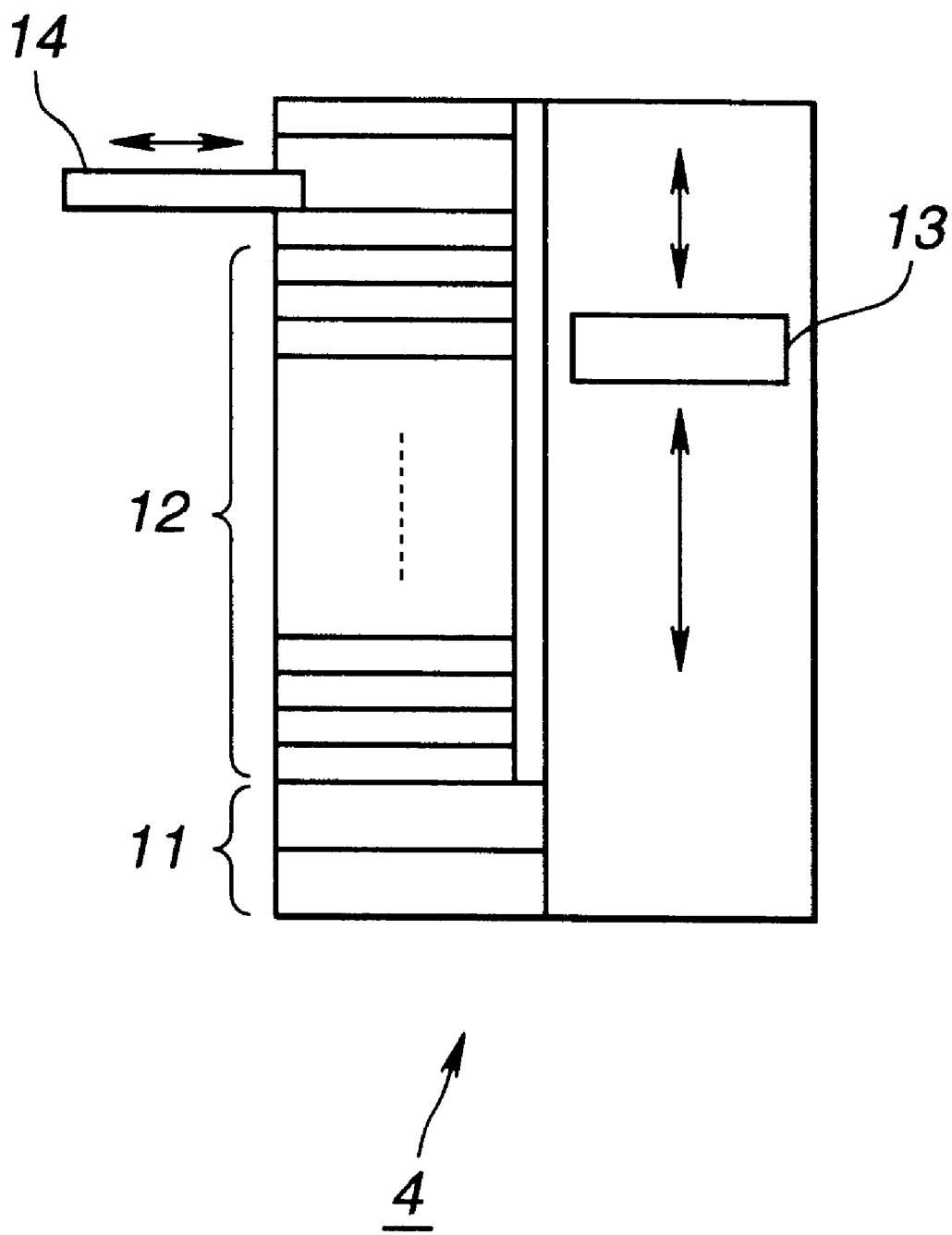
FIG. 5 is a view showing an internal mechanism of a changeable storage device for recording media applied to the present invention.

As shown in FIG. 5, the operating unit of the disk changer 4 is configured of the data recording and reproducing unit 11, the disk storage shelf 12, the disk conveying unit 13, and the tray 14.

Since the disk changer 4 is configured as mentioned above, the volume ID indicating the title of the disk stored in the disk changer 4 is stored in the nonvolatile RAM 16 for managing the disk. Further, the disk changer 4 enables the interface between the microcomputer 17 and the host computer 3 through the effect of the SCSI controller 19, so that the data stored in the nonvolatile RAM 16 may be transferred between the microcomputer 17 and the host computer 3 through the SCSI controller 19. In addition, the details of each component of the disk changer 4 will be described below.

The host computer 3 operates to transmit the send volume tag 2 composed of command information and the like and the Volume Tag 1 following the send volume tag 2 to the disk changer 4 through the SCSI bus.

As shown in FIG. 2, the Send Volume Tag 2 defines an element address 2a for indicating a storage address of the disk stored in the disk storage shelf 12 of the disk changer 4 by using a Byte 2 and a Byte 3 and defines a send action code 2b for specifying the operation executed by the disk changer 4 by using four bits contained in the Byte 5.

The send action code 2b defines an assert code that is a command for defining the volume ID of the disk stored in the disk changer 4 and a retrieval code that is a command for retrieving the disk of a specific volume ID. In addition, the assert code is a coded command of 8h (Hexadecimal). The retrieval code is a coded command of 1h.

As shown in FIG. 1, the volume tag defines a volume ID template field 1a for retrieving the title information of the disk stored in the disk changer 4 by using 32 bytes (Bytes 0 to 31). The volume tag 1 defines the type information of the disk in the volume ID template filed 1a.

In a case that the volume ID is defined in each of the disks stored in the disk changer 4 connected with the host computer 3 through the interface of the SCSI-2 standard, the host computer 3 considers the send action code 2b of the send volume tag 2 as an assert code, set the volume ID to be defined in the volume ID template field 1a of the following parameter, and then send the set send volume tag 2 and the set volume tag 1 to the disk changer 4. The disk changer 4 saves the data of the volume tag 1 sent from the host computer as the database in the nonvolatile RAM 16. The disk changer 4 manages each of the disks stored in the disk storage shelf 12 by the volume IDs stored in the nonvolatile RAM 16.

In a case of retrieving the disk with a specific volume ID, the host computer 3 operates to translate the send action code 2b into the translation code, set the volume ID template to be retrieved to the volume ID template file 1a of the parameter following the send action code 2b, and send the volume ID template field 1a to the disk changer 4. The disk changer 4 operates to retrieve the disk of the sent volume ID from the database in the nonvolatile RAM 16, and then gives back the retrieved result to the host computer 3 by using the request volume element address defined by the SCSI command.

The application of the information transmitting method according to the present invention makes it possible to locate the type information of the disk in the volume ID template field inside of the volume tag 1.

The type information of the disk concerns with the information about the writing function of the disk. For example, the information indicates a read-only disk such as the so-called CD-ROM, a write-only disk such as the so-called CD-R (or CD-WO), and an erasable disk such as the so-called CD-E (or CD-RW).

The type information of the disk in the volume ID template field is defined by using Bytes 29 to 31 of the Bytes 0 to 31 secured for the volume ID template field.

The type of the disk is set to the Bytes 29 and 30 as listed in Table 1 in a manner to meet the foregoing conditions. The write information of the disk is set to Byte 31 as listed in Table 2. For example, the setting is done by the ASCII (American Standard Code for Information Interchange) code.

TABLE 1

| Type of Media | Byte 29 | Byte 30 |
| --- | --- | --- |
| CD-ROM | 'R' | 'O' |
| CD-R | 'W' | 'O' |
| CD-E | 'E' | 'R' |

TABLE 2

| Write Information | Byte 31 |
| --- | --- |
| Write Enable | 'E' |
| Write Disable | 'D' |

For example, for setting the volume ID of "Changer Manager Installer" to the CD-R stored in the disk changer 4 and disabling the write of the CD-R with the volume ID, the send action code 2b of the send volume tag 2 is set as the assert code, for example, '8h'. The volume ID template field 1a is set as "Changer Manager Installer". Then, the Byte 29 of the volume ID template field 1a is set to 'W', the Byte 30 thereof is set to 'O', the Byte 31 thereof is set to 'D'. These 'W', 'O' and 'D' indicate the ASCII code as mentioned above.

Figure 6:
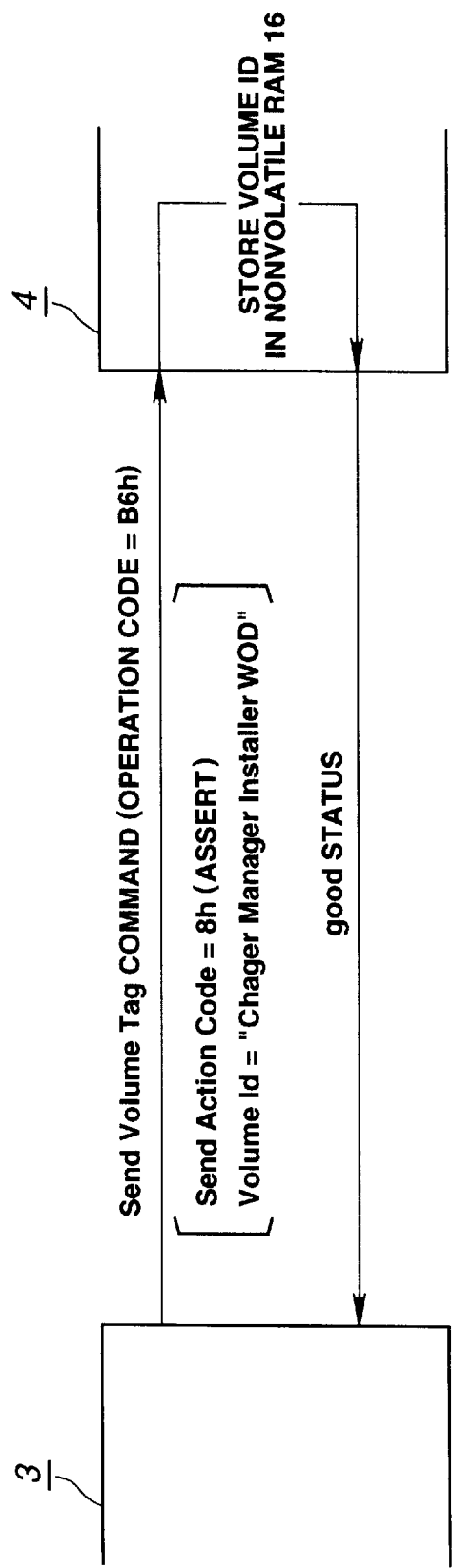
FIG. 6 is a diagram showing a signal line used in transmitting a type code from the host computer to a specific disk stored in the changeable storage device for recording media applied to the present invention.

As shown in FIG. 6, the volume ID of the disk and the type information thereof are sent from the host computer 3 to the disk changer 4, so that the data sent thereto is saved in the nonvolatile RAM 16 of the disk changer 4. On completion of the saving in the disk changer 4, a good status is given back to the host computer 3.

Further, for example, for retrieving the CD-E of the disks stored into the disk changer 4, the send action code 2b of the send volume tag 2 is translated into a translation code, for example, '1h'. Then, the volume ID template filed 1a is translated into '??? . . . ???'. The Byte 29 of the volume ID template field 1a is set to "E", the Byte 30 thereof is set to "R", and the Byte 31 thereof is set to "E".

Figure 7:
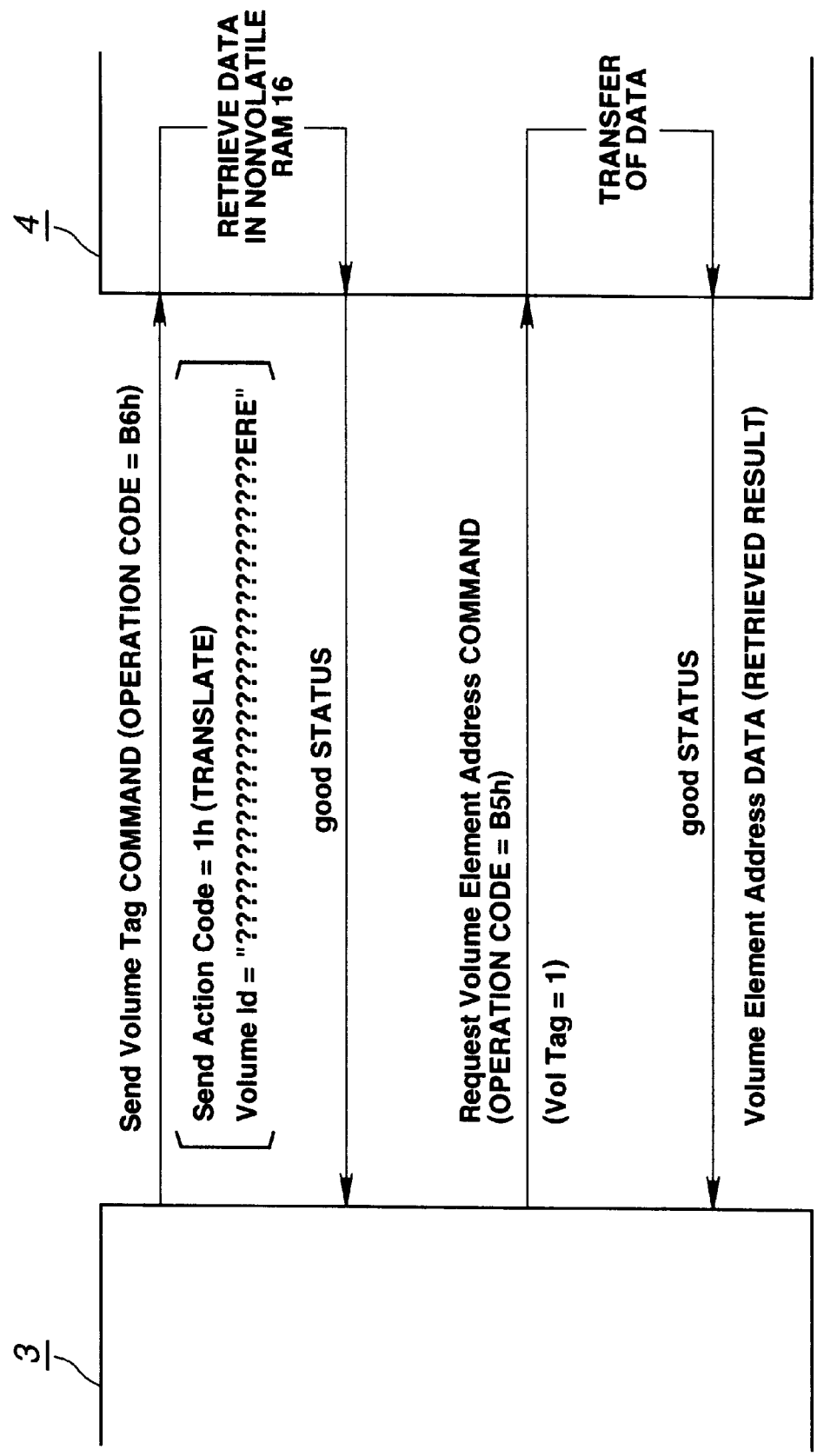
FIG. 7 is a diagram showing a signal line used in enabling the host computer to retrieve a specific disk stored in the changeable storage device for recording media.

As shown in FIG. 7, the host computer 3 operates to send the volume ID sent as mentioned above and the type information of the disk to the disk changer 4 so that the data stored in the nonvolatile RAM 16 of the disk changer 4 may be retrieved. Then, when the retrieval is terminated with no error, a good status is given back from the disk changer 4 to the host computer 3.

Figure 8:
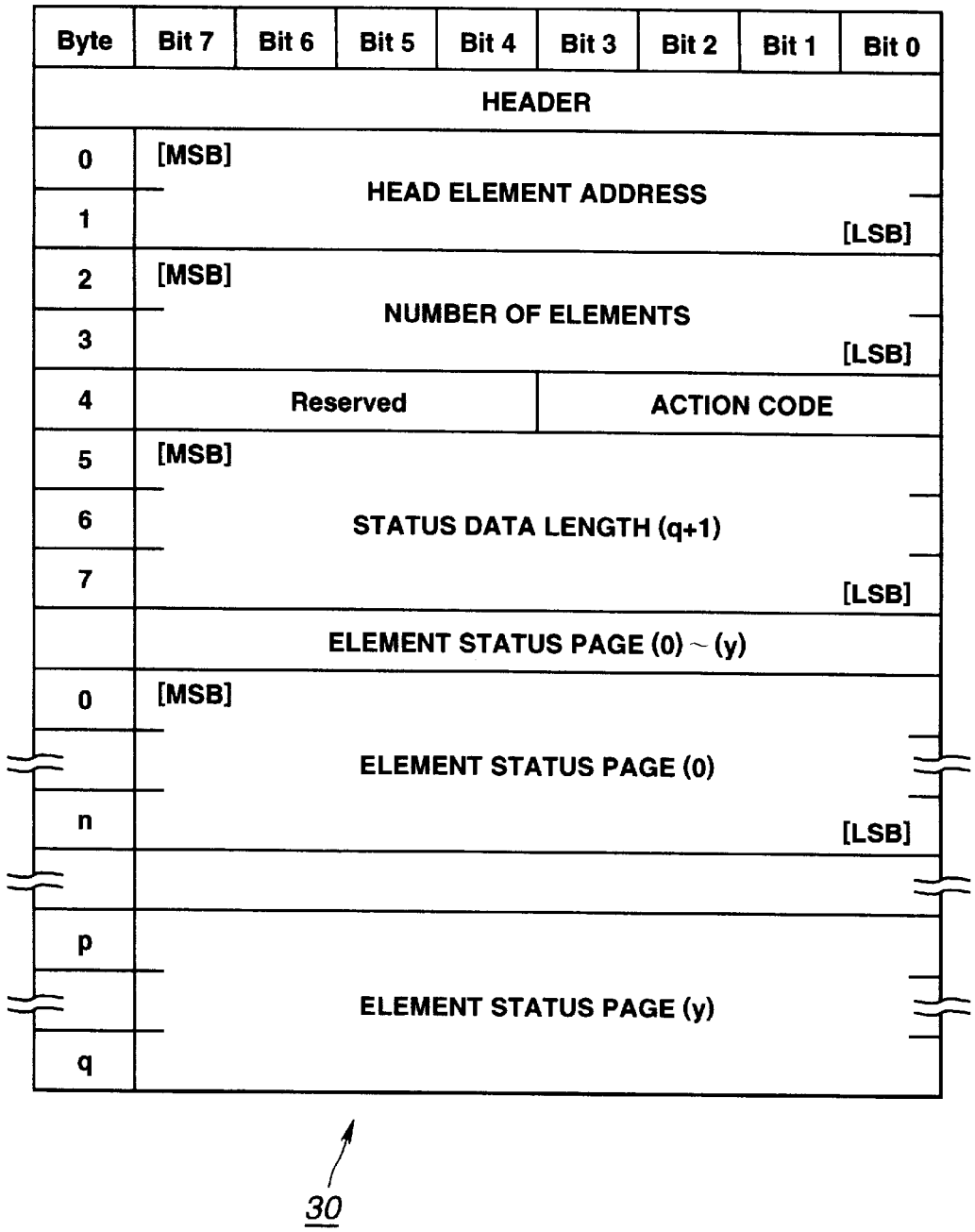
FIG. 8 is a view showing a data structure about volume element address data of the SCSI-2 standard applied to the present invention.

The retrieved result of the disk is defined in the element status page contained in the volume element address data 30 shown in FIG. 8 given back with the request volume element address and then is reported.

As mentioned above, in the interface of the SCSI-2 standard through which the command information is transmitted between the host computer 3 and the disk changer 4, by locating the type information of each disk at a given location where defined is the volume ID of the disk in the volume tag 1 transmitted with the send volume tag 2 served as the command information, it is possible to transmit the type information of each disk to the disk changer 4 together with the volume ID without providing a new standard for transmitting the type information of each disk and another kind of type information of each disk.

As described above, it is assumed that the changeable storage device for recording media can accommodate 100 disks as an upper numerous limit, stores CD-ROM disks in the 1st to the 10th slots, CD-R disks in the 11th to the 20th slots, CD-E disks in the 21st to 30th slots, and no disk in the remaining 31st to 100th slots.

The user remembers the location of the disk he or she stores. As shown in FIG. 6, the host computer 3 is operated to transfer the volume ID and the type information of the disk to the disk changer 4 and then map the type information to each disk stored in the nonvolatile RAM 16 provided in the disk changer 4.

For example, the disk changer 4 is not inevitably required to return the disk taken out of the slots to the original slot. In place, it may give the disk back to one of the empty slots. In this case, if mapping in the nonvolatile RAM 16 is edited and the edited content is given back to the host computer 3, no inconsistency between the host computer 3 and the disk changer 4 takes place.

By this operation, the disk changer 4 operates to store the volume ID of each disk and the type information thereof in the nonvolatile RAM 16.

Further, the host computer 3 enables to discriminate the type of the disk based on the type information of the disk stored in the nonvolatile RAM 16 of the disk changer 4. Hence, the host computer 3 is not required to discriminate the disk based on the recorded content, so that it may prevent the recorded data from being erroneously erased.

It is considered that the disk changer 4 may discriminate the type of the disk according to the difference of the disk form. However, if each disk has the substantially same form, it is difficult to discriminate the type of the disk. Even in this case, the disk may be easily discriminated by using the type information of the disk stored in the nonvolatile RAM 16.

The description has been oriented to the CD as the recording medium whose type is to be identified by the volume tag 1. The information transmitting method according to the present invention may apply to the storage device for recording media for saving another recording medium. For example, as to the DVD, the DVD-ROM that has only a function of reading data, the DVD-R that has a function of writing data only once, and the DVD-RAM that has a function of writing and erasing data may be referred. In correspondence to these types, the type information of the DVD is defined in Bytes 29 and 30 of the volume ID template field as listed in Table 3.

TABLE 3

| Type of Media | Byte 29 | Byte 30 |
| --- | --- | --- |
| DVD-ROM | 'D' | 'O' |
| DVD-R | 'D' | 'R' |
| DVD-RAM | 'D' | 'A' |

The information transmitting system according to the present invention enables to prevent the recorded data from being erroneously erased. In this case, before conveying the disk to the data recording and reproducing unit 11, the host computer 3 operates to set the volume tag bit of the SCSI command to 1 and then transmit it to the disk changer 4. The disk changer 4 operates to read the volume tag 1 of the disk specified by the firmware from the database of the nonvolatile RAM 16 and give it back to the host computer 3. The host computer 3 determines if the disk is enabled to write data by checking the Byte 31 of the volume ID template field 1a of the volume tag received thereby and then determines if the disk is to be conveyed.

Later, the disk changer 4 will be described in detail. As mentioned above with respect to FIG. 4, the data changer 4 includes the data recording and reproducing unit 11, the disk storage shelf 12, the disk conveying unit 13, the tray 14, the mechanism unit 15, the nonvolatile RAM 16, the microprocessor 17, the ROM 18, the SCSI controller 19, the display unit 20, and the key operating unit 21.

The data recording and reproducing unit 11 operates to write and read the data on and from the disk stored in the disk recording and reproducing unit 11. This data recording and reproducing unit 11 is connected to the SCSI bus so that the data may be read out of the disk and written on the disk. The number of the data recording and reproducing units 11 is limited to not only one but also to two or more.

The disk storage shelf 12 may store two or more disks. For example, the disk storage shelf 12 is composed of plural slots for storing the disks respectively. The disk conveying unit 13 is arranged to move the disk between the data recording and reproducing unit 11 and each slot of the disk storage shelf 12 so that the disk taken out of the disk storage unit 12 is conveyed to the data recording and reproducing unit 11.

For example, if the disk is conveyed to the tray 14, each slot of the disk storage shelf 12 and the data recording and reproducing unit 11, the disk conveying unit 13 operates to vertically move the disk as shown in FIG. 5 with the disk being held therein. Further, when the disk is placed on the disk conveying unit 13, the clip of the conveying unit 13 operates to clip the peripheral portion of the disk and horizontally slide the disk for moving the disk to the central portion of the disk conveying unit 13. For ejecting the disk out of the disk conveying unit 13, the reverse operation is executed.

As shown in FIG. 5, the tray 14 is operated to eject the disk out of the disk changer 4 or load the disk into the disk changer 4. For ejecting the disk, for example, the tray 14 is horizontally moved to the position where the user can pick it with his or her fingers.

The microprocessor 17 performs the processing according to the firmware recorded in the ROM 18. For example, the microprocessor 17 performs the processings by the circuit (not shown) for controlling the mechanism unit 15, the SCSI controller 19, the display unit 20, the keying operation unit 21, and so forth according to the firmware. For example, the microprocessor 17 enables to write and read data on and from the nonvolatile RAM 16. Further, the microprocessor 17 is operated by commands inputted from the host computer 3 through the SCSI controller 19.

The SCSI controller 19 is connected to the SCSI bus so that the interface between the microprocessor 17 and the host computer 3 is enabled. The nonvolatile RAM 16 is served as storage means for storing the volume ID and the type information of each of the disks stored in the disk storage shelf 12. In place of the nonvolatile RAM 16, for example, another cell rather than the battery of the disk changer 4 itself may be used for holding the stored content.

The display unit 20 may be composed of a liquid crystal display unit. The keying operation unit 11 is located outside of the disk changer 4 and is operated by the user.

Since the disk changer 4 is composed as mentioned above, the nonvolatile RAM 16 may store the type information together with the volume ID of each of the disks stored in the disk storage shelf 12. Further, the data sent from the host computer 3 through the SCSI interface is inputted into the disk changer 4 through the SCSI controller 19 and then put into the nonvolatile RAM 16 for storing the data.

As described above, the disk changer 4 stores the information about each disk in the nonvolatile RAM 16. Hence, if the disk changer 4 holds the disks with various writing functions mingled therein, the management of the disks does not need any other means except the disk changer 4, so that the writing information of the disk may be easily arranged.

Since the host computer 3 does not need to manage the disks stored in the disk changer 4, the combination of the disk changer 4 and the host computer 3 is not fixed. Hence, the connection of the host computer 3 with the disk changer 4 is so thin that the disks may be managed flexibly in maintenance. For example, the host computer 3 may use the database of the nonvolatile RAM in a new jukebox when changing the disk changer.

Further, the database about the volume tag 1 of every disk stored in the disk changer 4 is stored in the nonvolatile RAM 16. Hence, the database does not disappear if the disk changer 4 is powered off.

Moreover, the storage device for recording media may store not only CDs and DVDs but also another kind of recording medium having another form and writing function. In addition, the interface between the host computer 3 and the disk changer 4 is not limited to the SCSI-2.

The information transmitting method according to the present invention is a method for transmitting command information based on the interface standard between the host computer and the peripheral equipment. This method is capable of transmitting the type information and the title information of the recording medium to the storage device for recording media for storing the recording media recognized as the peripheral equipment by locating the type information of the recording medium at the given location of the title information of the recording medium to be transmitted with the command information.

Hence, the information transmitting method enables to transmit the type information of the disk to the storage device for recording media recognized as the peripheral equipment without having to provide a new standard and transmit it on another way, Further, the storage device for recording media according to the present invention includes storage means for storing the type information of recording media stored in the storage means, control means for reading and writing the type information of the recording medium from and on the recording medium, and I/O control means for controlling an I/O of the type information of the recording medium, located at a given location of the title information of the recording medium transmitted based on the peripheral equipment interface standard and stored in the storage means. The control means enables to store the type information of the recording media in the storage means. The I/O control means enables to input and output the type information of the recording medium stored in the storage means and at a given location of the title information transmitted on the peripheral equipment interface standard.

The storage device for recording media, therefore, determines the type of the recording medium without having to check the content recorded on the recording medium and manage the recording medium without having to depend on the outside equipment such as the host computer.

What is claimed is:

1. A data storage system comprising:

a host computer for selecting a desired recording medium stored in a recording medium saving device and retrieving information stored in the selected recording medium by communicating type information of the selected recording medium to the recording medium saving device;

the recording medium saving device having:

storage means for storing a plurality of recording media having the same physical form but different logical recording formats;

conveying means for conveying said selected medium to a driving means;

means for saving type information for discriminating the plurality of recording media stored in said storage means;

control means for controlling the writing to and reading from said saving means the type information corresponding to the selected recording medium stored in said storage means; and interface means for transferring the type information of the selected recording medium from the host computer to the recording medium saving device in a predetermined interface protocol.

2. The data storage system as claimed in claim 1, wherein said predetermined interface protocol conforms to the SCSI-2 standard.

3. The data storage system as claimed in claim 1, wherein the type information transmitted from said host computer to said recording medium saving device is an identifier for identifying if the selected recording medium is a read-only medium or a recordable medium.

4. The data storage system as claimed in claim 1, wherein the type information transmitted from said host computer to said recording medium saving device is an identifier for identifying if the selected recording medium is an erasable medium or a nonerasable medium.

5. The data storage system as claimed in claim 1, wherein the type information transmitted from said host computer to said recording medium saving device indicates title information of said selected recording medium.

6. The data storage system as claimed in claim 1, wherein said host computer selects the recording medium from the plurality of recording media stored in said recording medium saving device by communicating the type information to said recording medium saving device; and said host computer is enabled to obtain the retrieved result from said recording medium saving device by transferring a request signal for requesting the retrieved result from said host computer to said recording medium saving device if the type information from said host computer matches that of the retrieved recording medium.

7. A method for retrieving a selected recording medium in a changeable storage device for loading various recording media having the same physical form but logically different formats from a host computer through a given interface, comprising the steps of:

saving type information for discriminating the various recording media in said storage device;

transferring type information of the selected recording medium from said host computer to said storage device;

enabling said host computer to receive an identifier for indicating retrieved results from said storage device;

transferring a request signal for requesting the retrieved results from said host computer to said storage device; and enabling said host computer to receive the retrieved results from said storage device.

8. The retrieving method as claimed in claim 7, wherein said given interface conforms to the SCSI-2 standard.

9. The retrieving method as claimed in claim 7, wherein the type information transmitted from said host computer to said storage device is an identifier for identifying whether the selected recording medium is a read-only medium or a recordable medium.

10. The retrieving method as claimed in claim 7, wherein the type information transmitted from said host computer to said storage device is an identifier for identifying whether the selected recording medium is an erasable medium or a nonerasable medium.

11. The retrieving method as claimed in claim 7, wherein the type information transmitted from said host computer to said storage device indicates title information of the selected recording medium.

* * * * *